US007008475B2

(12) United States Patent
Randler et al.

(10) Patent No.: US 7,008,475 B2
(45) Date of Patent: Mar. 7, 2006

(54) WATER-BASED COLORANT PREPARATIONS

(75) Inventors: Rudolf Randler, Dallenwil (CH); Ulrike Rohr, Mannheim (DE); Josef Geisenberger, Sulzbach (DE); Ruediger Baur, Eppstein/Ts (DE); Hans-Tobias Macholdt, Darmstadt-Eberstadt (DE); Heidemarie Menzel, Bad Soden (DE)

(73) Assignee: Clariant GmbH, Frankfurt (DE)

( * ) Notice: Subject to any disclaimer, the term of this patent is extended or adjusted under 35 U.S.C. 154(b) by 199 days.

(21) Appl. No.: 10/483,132

(22) PCT Filed: Jun. 21, 2002

(86) PCT No.: PCT/EP02/06884

§ 371 (c)(1),
(2), (4) Date: Jan. 8, 2004

(87) PCT Pub. No.: WO03/008503

PCT Pub. Date: Jan. 30, 2003

(65) Prior Publication Data

US 2004/0206271 A1 Oct. 21, 2004

(30) Foreign Application Priority Data

Jul. 11, 2001 (DE) ................................ 101 33 643

(51) Int. Cl.
*C09D 11/02* (2006.01)
*C09C 1/44* (2006.01)
*C09B 48/00* (2006.01)

(52) U.S. Cl. ................................ 106/31.27; 106/31.28; 106/31.58; 106/31.6; 106/31.75; 106/31.77; 106/31.78; 106/31.79; 106/31.81; 106/31.86; 106/31.9; 106/476; 106/496; 106/497; 106/498; 106/499

(58) Field of Classification Search ............ 106/31.27, 106/31.28, 31.58, 31.6, 31.75, 31.77, 31.78, 106/31.79, 31.81, 31.86, 31.9, 476, 496–499
See application file for complete search history.

(56) References Cited

U.S. PATENT DOCUMENTS

| | | | | |
|---|---|---|---|---|
| 4,218,218 | A * | 8/1980 | Daubach et al. | 8/550 |
| 4,403,077 | A | 9/1983 | Uhrig et al. | 522/502 |
| 5,186,846 | A * | 2/1993 | Brueckmann et al. | 516/66 |
| 6,077,339 | A | 6/2000 | Nyssen et al. | 106/31.77 |
| 6,294,592 | B1 | 9/2001 | Herrmann et al. | 106/31.6 |
| 6,332,943 | B1 | 12/2001 | Herrmann et al. | 106/31.86 |
| 6,383,277 | B1 * | 5/2002 | Loosli | 106/31.6 |
| 6,465,567 | B1 | 10/2002 | Grobe et al. | 524/611 |
| 2001/0029273 | A1 * | 10/2001 | Taniguchi et al. | 523/161 |
| 2004/0171738 | A1 * | 9/2004 | Harz et al. | 524/556 |

FOREIGN PATENT DOCUMENTS

| | | | |
|---|---|---|---|
| DE | 19644077 | A1 | 5/1998 |
| EP | 0065751 | A1 | 12/1982 |
| EP | 0827990 | A2 | 3/1998 |
| EP | 1054045 | A1 | 11/2000 |
| EP | 1116757 | A2 | 7/2001 |
| WO | WO 99/01516 | | 1/1999 |
| WO | WO 99/01517 | | 1/1999 |

OTHER PUBLICATIONS

Peter Koberle, “Sulphobetaines & Ethersulphonates: Unique Surfactants Via Sulphopropylation Reactions,” Industrial Application of Surfactants IV; pp 213-226; 1999, no month available.

* cited by examiner

*Primary Examiner*—Helene Klemanski
(74) *Attorney, Agent, or Firm*—Anthony A. Bisulca

(57) ABSTRACT

The invention relates to aqueous colorant preparations containing A) between 0.1 and 50 wt. % of at least one organic and/or inorganic pigment and/or at least one organic colorant. B) between 0.01 and 80 wt. % of at least one naphthol-oxyalkylate sulfopropyl ether, one alkanol-oxyalkylate sulfopropyl ether or one alkylphenol-oxyalkylate sulfopropyl ether. C) between 0 and 30 wt. % of at least one organic solvent. D) between 0 and 20 wt. % of other standard derivatives and E) between 10 and 90 wt % of water, respectively in relation to the total weight (100%) of the colorant preparation. The colorant preparation is used, for example, in printing inks, especially ink jet printing inks.

18 Claims, No Drawings

WATER-BASED COLORANT PREPARATIONS

The present invention relates to waterborne colorant dispersions, a process for their production, their use as recording fluids, especially for the ink jet printing process, and also their use in electrophotographic toners, especially polymerization toners, in powder coatings and in color filters.

The ink jet printing process, like for example electrophotography (laser printers and copiers), is a nonimpact printing process and has become more and more important, especially in the small office, home office (SOHO) sector, owing to the increasing use of computers.

Ink jet printing technology distinguishes between the so-called continuous printing processes and the drop-on-demand processes, the drops in question being ink drops which are generated by a computer-controlled electrical signal. There are basically two kinds of drop-on-demand ink jet processes, namely thermal ink jet, also known as bubble jet, and piezoelectric ink jet. Whereas in thermal ink jet the pressure wave which leads to the expulsion of a drop of ink from a nozzle of the print head is generated by the input of thermal energy via a heating element, piezoink jet printing utilizes the spontaneous shape change of a piezoelectric crystal on application of a voltage signal to generate the pressure wave needed. Both piezoelectric and thermal ink jet are notable for a high technical standard for the production of colored images of high optical quality or even photoquality and are also suitable for the production of large format prints at high rates of printing speed.

Thermal and piezoelectric ink jet have hitherto employed inks which are based on solutions of water-soluble dyes, which is why the prints possess high brilliance and optical density, but insufficient lightfastness and poor water resistance. These disadvantages of dye-based ink jet inks can only be partly overcome by the use of specialty papers. One way of overcoming the aforementioned disadvantages of dye-based inks would be to use pigmented inks.

Pigmented inks for ink jet printing would have to meet a whole series of requirements. They have to have a viscosity and surface tension suitable for printing, they have to be stable in storage, ie they should not coagulate and the dispersed pigment should not sediment, they must not clog the printer nozzles, which can be problematical in the case of pigment particle inks especially, and they should be environmentally friendly, ie be substantially waterborne and contain very low concentrations of organic solvents. Similarly, the purity of the preparations has to meet high requirements, since excessive concentrations of inorganic or organic salts and ions, especially chloride ions, lead to corrosion and hence to premature destruction of the print heads or in the case of bubble jet printers to harmful deposits on the heating elements.

High standards are required especially of the color strength, the hue, the brilliance, transparency and fastness properties, for example lightfastness, waterfastness and crockfastness of the pigments and prints. High lightfastness is important especially when the ink jet process is to be used to produce prints of photographic quality or for outdoor use.

A fine state of subdivision is a basic prerequisite for pigment preparations for use in ink jet printing, since the avoidance of nozzle clogging requires that the average pigment particle size not exceed 200 nm and that the particle size distribution be very narrow, so that even the maximum particle size does not exceed 500 nm. As well as a fine state of subdivision, it is particularly the flocculation resistance which is a very important quality criterion of an ink jet preparation, which is why crystal growth or agglomeration of the pigment particles has to be effectively prevented by means of suitable additives. This is usually accomplished by means of certain dispersing assistants. A pigment dispersion property closely related to its flocculation resistance is its stability in storage, since the pigment particles must not agglomerate during prolonged storage, even at elevated or reduced temperatures compared with room temperature. During printing, pigmented inks are subjected to extreme thermal and mechanical stresses; the dispersing assistant has to ensure pigment dispersion stability even in these circumstances. Transient temperature jumps of up to 500° C. occur in thermal ink jet. Even in these conditions, the pigment may neither flocculate or cogate (sediment) on the heating elements of the printer nor clog the printer nozzles. In printing, the pigmented ink is flung through a narrow nozzle; extremely high shearing stresses occur in the process, but they must not cause the dispersing assistant to be sheared off the pigment surface.

Accordingly, the dispersing assistant used is of decisive importance, not only because it determines the physical properties, for example surface tension and viscosity, of the dispersions, but also because it shall stabilize the inks against flocculation in the course of storage and decomposition in the course of the printing operation.

Prior art pigmented preparations for ink jet printing often fail to meet printer manufacturers' requirements in that they are deficient in subdivision, thermal stability and stability in storage.

Especially the stability problems of pigmented ink jet inks are closely tied to adequate stabilization of the pigment particles in the aqueous organic solutions.

It is known from WO 99/01517, U.S. Pat. No. 6,077,339 and EP 1 054 045 A1 that especially the alkoxylation products of phenol-styrene condensates and their derivatives that have been ionically modified, ie completely or partially converted into sulfuric monoesters using sulfur trioxide or chlorosulfonic acid, and neutralized using alkaline agents are useful as dispersing assistants which are suitable for the production of pigment preparations for ink jet inks.

It is therefore an object of the present invention to provide colorant preparations which are readily dispersible and stable in storage and, in particular, have good printing properties in the ink jet printing process.

This object is achieved, surprisingly, by the use of water-soluble sulfopropyl ethers of alkoxylated naphthols, alkanols or alkylphenols as dispersants in colorant preparations.

These sulfopropylated dispersions are significantly more suitable for producing pigment preparations for ink jet printing than, for example, the sulfuric monoesters of alkoxylated phenol-styrene condensates that are described in WO 99/01517, U.S. Pat. No. 6,077,339 or EP 1 054 045 A1 since the storage stability of the pigment preparations, even at elevated temperature, is substantially improved. In addition, the sulfopropyl ethers are very pure, compared with the sulfuric monoesters, owing to the different kind of synthesis, so that they are substantially free of inorganic salts and especially the halide content is very low. A low concentration of halide ions, especially of chloride ions, reduces the corrosion of the print heads. A further advantage is that the dispersants of the present invention have no cloud point, ie there is no risk of phase separation and flocculation at higher temperature with these dispersants.

The present invention accordingly provides colorant preparations consisting essentially of A) 0.1 to 50% by weight and preferably 1 to 30% by weight of at least one organic and/or inorganic pigment and/or at least one organic dye, B) 0.01 to 80% by weight and preferably 0.1 to 50% by weight of at least one naphthol alkoxylate sulfopropyl ether, alkanol alkoxylate sulfopropyl ether or alkylphenol alkoxylate sulfopropyl ether C) 0 to 30% by weight and preferably 0.1 to 15% by weight of at least one organic solvent, D) 0 to 20% by weight and preferably 0.1 to 5% by weight of further customary additives, E) 10 to 90% by weight and preferably 20 to 60% by weight of water, each percentage being based on the total weight (100% by weight) of the colorant preparation.

Component (A) is a finely divided organic or inorganic pigment and/or an organic dye or a mixture of various organic and/or inorganic pigments and/or organic dyes. The pigments can be used not only in the form of dry powders but also as water-moist presscakes.

Useful organic pigments include a monoazo, disazo, laked azo, β-naphthol, Naphtol AS, benzimidazolone, disazo condensation, azo metal complex pigment or a polycyclic pigment, such as for example a phthalocyanine, quinacridone, perylene, perinone, thiazineindigo, thioindigo, anthanthrone, anthraquinone, flavanthrone, indanthrone, isoviolanthrone, pyranthrone, dioxazine, quinophthalone, isoindolinone, isoindoline or diketopyrrolopyrrole pigment or carbon black.

Useful inorganic pigments include for example titanium dioxides, zinc sulfides, iron oxides, chromium oxides, ultramarine, nickel- or chromium antimony titanium oxides, cobalt oxides and bismuth vanadates.

Useful organic dyes include acid dyes, direct dyes or reactive dyes; in the case of reactive dyes, dyes which have been reacted with nucleophiles can be used as well. The pigments used should be very finely divided, in that preferably 95% and more preferably 99% of the pigment particles have a particle size ≦500 nm. The average particle size is preferably <200 nm. Depending on the pigment used, the morphology of the pigment particles can vary widely, and accordingly the viscosity behavior of the pigment preparations can vary widely as a function of the particle shape. To obtain a favorable viscosity behavior for the preparations, the particles should preferably have a cuboid or spherical shape. A selection of particularly preferred organic pigments are carbon black pigments, for example lampblacks or furnace blacks; monoazo, disazo and benzimidazolone pigments, especially the Colour Index pigments Pigment Yellow 17, Pigment Yellow 74, Pigment Yellow 83, Pigment Yellow 97, Pigment Yellow 120, Pigment Yellow 128, Pigment Yellow 139, Pigment Yellow 151, Pigment Yellow 155, Pigment Yellow 180, Pigment Yellow 213, Pigment Red 57:1, Pigment Red 146, Pigment Red 176, Pigment Red 184, Pigment Red 185 or Pigment Red 269; phthalocyanine pigments, especially the Colour Index pigments Pigment Blue 15, Pigment Blue 15:3 or Pigment Blue 15:4 and quinacridone pigments, especially the Colour Index pigments Pigment Red 122 or Pigment Violet 19.

A selection of particularly preferred organic dyes are the Colour Index dyes Acid Yellow 17, Acid Yellow 23, Direct Yellow 86, Direct Yellow 98, Direct Yellow 132, Reactive Yellow 37, Acid Red 52, Acid Red 289, Reactive Red 23, Reactive Red 180, Acid Blue 9 and Direct Blue 199.

Component (B) of the colorant preparations according to the invention comprises at least one water-soluble dispersing assistant based on a water-soluble completely or partially sulfopropylated alkoxylated naphthol, alkanol or alkylphenol.

Preferred dispersing assistants are compounds of the formula (II) and also their mixtures with compounds of the formula (I)

(I)

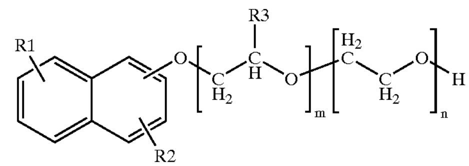

(II)

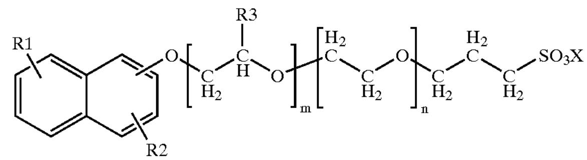

where

R1 and R2 are identical or different and are each a $C_1$–$C_{12}$-alkyl radical which may contain polar groups such as alcohol groups, amine groups, keto groups, amide groups or ester groups, or are each a phenyl radical or H, R3 is a $C_1$–$C_4$-alkyl radical or a phenyl radical, preferably methyl, m is from 0 to 50, preferably from 0 to 30, especially from 1 to 20, n is from 1 to 100, preferably from 2 to 50, especially from 5 to 30, subject to the proviso that n≧m;

X is a singly positively charged ion, for example the ion of an alkali metal such as Li, Na, K, Rb or Cs, or a hydrogen ion or an ammonium ion or a mono-, di-, tri- or tetraalkylammonium ion.

Preferred compounds of the formulae (I) and (II) are those whose alkoxy chain is in the beta position of the naphthol (β naphthols). The alkoxy radicals $—(CH_2—CHR^3—O—)_m$ and $—(CH_2—CH_2—O—)_n$ can each be present as a block or as a random distribution in the chain.

The dispersing assistants preferably contain 0 to 50% by weight of molecules of the formula (I) and 50 to 100% by weight of molecules of the formula (II).

Particularly preferred compounds of the formulae (I) and (II) are the compounds of the formulae (III) and (IV)

(III)

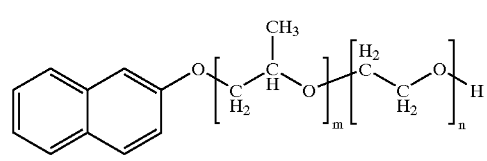

(IV)

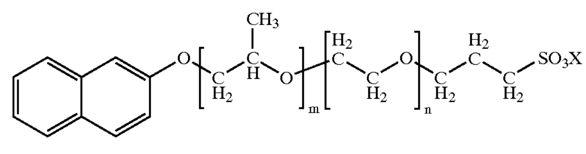

where m, n and X are each as defined above.

The preferred dispersing assistants contain 0 to 50% by weight of molecules of formula (III) and 50 to 100% by weight of molecules of the formula (IV).

As well as the completely or partially sulfopropylated alkoxylated naphthols, it is also possible to use completely or partially sulfopropylated alkoxylated alkanols or completely or partially sulfopropylated alkoxylated alkylphenols as dispersing assistants. In these compounds too the use of the sulfopropyl grouping ensures significantly better storage stabilities and viscosity properties compared with the conventionally used terminal carboxylate, phosphate or sulfate groups.

The colorant preparations according to the invention may therefore also include compounds of the formula (VI) and their mixtures with compounds of the formula (V)

(V)

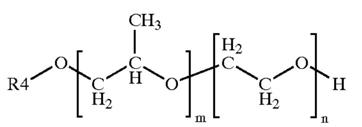

(VI)

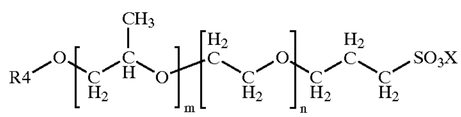

where m, n and X are each as defined above and
R4 is R5 or

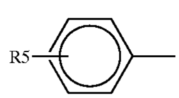

where R5 is a linear or branched $C_1$–$C_{24}$-alkyl radical which may contain polar groups such as alcohol groups, amine groups, keto groups, amide groups or ester groups.

The dispersing assistants mentioned may contain 0 to 50% by weight of molecules of the formula (V) and 50 to 100% by weight of molecules of the formula (VI).

The synthesis of the dispersing assistants used according to the invention is in itself literature known and carried out in two steps. The first step has the naphthols, alkanols or alkylphenols alkoxylated by reaction of the corresponding naphthoxides, alkoxides or alkylphenoxides with alkylene oxides at elevated temperature in an anionic polymerization. This synthetic step is analogous to the step involved in the preparation of sulfosuccinic monoesters of alkoxylated novolaks that is described in EP 0 065 751 A1 or analogous to the alkoxylation step which is described in DE 196 44 077 A1 for the preparation of ionically modified phenol-styrene polyglycol ethers. In the second step, the alkoxylated naphthols, alkanols or alkylphenols are converted under relatively mild, weakly basic conditions with 1,3-propanesultone into the corresponding sulfopropylated alkoxylated naphthols, alkanols or alkylphenols (Peter Köberle: "Sulphobetaines and Ethersulfonates: Unique Surfactants via Sulfopropylation Reactions"; in: Industrial Applications of Surfactants IV; D. R. Karsa, Ed.; The Royal Society of Chemistry, 1999).

The colorant preparations according to the invention may include as component (C) an organic solvent or a mixture of organic solvents, in which case these solvents may if desired possess a water-retaining effect. Useful solvents include for example mono- or polyhydric alcohols, their ethers and esters, for example alkanols, especially of 1 to 4 carbon atoms, for example methanol, ethanol, propanol, isopropanol, butanol, isobutanol; di- or trihydric alcohols, especially of 2 to 6 carbon atoms, eg ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, for example ethylene glycol monomethyl or ethyl or butyl ethers, triethylene glycol monomethyl or ethyl ethers; ketones and ketone alcohols, eg acetone, methyl ethyl ketone, diethyl ketone, methyl isobutyl ketone, methyl pentyl ketone, cyclopentanone, cyclohexanone, diacetone alcohol; amides, eg dimethylformamide, dimethylacetamide and N-methylpyrrolidone.

The colorant preparations according to the invention may further include, as component (D), further, additives which are especially customary for ink jet inks and in the printing and coatings industry, for example preservatives, antioxidants, cationic, anionic, amphoteric or nonionic surface-active substances (surfactants and wetting agents), degassers/defoamers and also agents for regulating the viscosity, for example polyvinyl alcohol, cellulose derivatives or water-soluble natural or artificial resins and polymers as film-formers or binders to enhance the adhesion and abrasion resistance. The pH regulators used include organic or inorganic bases and acids. Preferred organic bases are amines, for example ethanolamine, diethanolamine, triethanolamine, N,N-dimethylethanolamine, diisopropyl-amine, aminomethylpropanol or dimethylaminomethylpropanol. Preferred inorganic bases are sodium hydroxide, potassium hydroxide, lithium hydroxide or ammonia. Further constituents include hydrotropic compounds, for example formamide, urea, tetramethylurea, ε-caprolactam, ethylene glycol, diethylene glycol, triethylene glycol, polyethylene glycol, butylglycol, methylcellosolve, glycerol, sugar, N-methylpyrrolidone, 1,3-diethyl-2-methylimidazolidinone, thiodiglycol, sodium benzenesulfonate, sodium xylenesulfonate, sodium toluenesulfonate, sodium cumene-sulfonate, sodium benzoate, sodium salicylate or sodium butyl monoglycol sulfate.

Water used for the colorant preparation, component (E), is preferably used in the form of distilled or demineralized water.

This invention further provides a process for producing the colorant preparations according to the invention, which comprises a first step of at least one colorant (component A), either as a powder or as a presscake, being pasted up together with at least one dispersing assistant (component B), optionally with at least one organic solvent (component C) and optionally the other additions (component D) in preferably deionized water (component E) and subsequently homogenized and predispersed using a dissolver or some other suitable apparatus.

If appropriate, a fine dispersion operation follows using a bead mill or some other suitable dispersing assembly to the desired particle size distribution with cooling. After the fine dispersion operation, the dispersion can be diluted with deionized water to the desired colorant concentration.

This invention further provides a set of colorant preparations that includes at least one colorant preparation in each of the colors black, cyan, magenta and yellow, characterized by at least one of the preparations being a preparation according to the invention.

Preference is given to a set of pigment preparations characterized by the colorant of the black colorant preparation being a carbon black, especially a lampblack or a furnace black; the colorant of the cyan colorant preparation being a pigment from the group of the phthalocyanine pigments, especially the Colour Index pigments P. Blue 15, P. Blue 15:3 or P. Blue 15:4, the colorant of the magenta colorant dispersion being a pigment from the group of the quinacridone pigments, preferably a Colour Index P. Red 122 or P. Violet 19 or being a pigment from the group of the monoazo, disazo, isoindoline or benzimidazolone pigments, especially a Colour Index P. Red 57:1, P. Red 146, P. Red 176, P. Red 184, P. Red 185 or P. Red 269, and the colorant of the yellow colorant preparation preferably being a pigment from the group of the monoazo, disazo, isoindoline or benzimidazolone pigments, especially the Colour Index pigments Pigment Yellow 17, P. Yellow 74, P. Yellow 83, P. Yellow 97, P. Yellow 120, P. Yellow 128, P. Yellow 139, P. Yellow 151, P. Yellow 155, P. Yellow 180 or P. Yellow 213.

This invention further provides a set of printing inks that includes at least one printing ink in each of the colors black, cyan, magenta and yellow and is further characterized in that at least one of the printing inks includes the colorant preparation according to the invention in neat or dilute form with or without further additives.

This invention yet further provides for the use of the colorant preparations according to the invention as colorants for inks, especially ink jet inks, electrophotographic toners, especially polymerization toners, powder coatings and color filters.

By ink jet inks are meant not only waterborne inks (including microemulsion inks) but also solventborne inks, UV-curable inks as well as hotmelt inks.

Waterborne ink jet inks include essentially 0.5 to 30% by weight and preferably 1 to 15% by weight of one or more colorant preparations according to the invention, 70 to 95% by weight of water, 0 to 30% by weight of one or more hydrotropic, ie water-containing, compounds and/or organic solvents. Waterborne ink jet inks may optionally further include water-soluble binders and further additives, for example surfactants and wetting agents, degassers/defoamers, preservatives and antioxidants. Microemulsion inks are based on organic solvents, water and optionally an additional substance to act as an interface mediator (surfactant). Microemulsion inks include 0.5 to 30% by weight and preferably 1 to 15% by weight of one or more colorant preparations according to the invention, 0.5 to 95% by weight of water and 0.5 to 95% by weight of organic solvent and/or interface mediator.

Solventborne ink jet inks consist essentially of 0.5 to 30% by weight of one or more colorant preparations according to the invention, 70 to 95% by weight of an organic solvent and/or of a hydrotropic compound. If desired, solventborne ink jet inks may include carrier materials and binders which are soluble in the solvent, for example polyolefins, natural and synthetic rubber, polyvinyl chloride, vinyl chloride-vinyl acetate copolymers, polyvinyl butyrals, wax/latex systems or combinations thereof.

UV-curable inks include essentially 0.5 to 30% by weight of one or more colorant dispersions according to the invention, 0.5 to 95% by weight of water, 0.5 to 95% by weight of an organic solvent, 0.5 to 50% by weight of a radiation-curable binder and optionally 0 to 10% by weight of a photoinitiator.

Hot melt inks are usually based on waxes, fatty acids, fatty alcohols or sulfonamides which are solid at room temperature and liquefy on heating, the preferred melting range being between about 60 and about 140° C. This invention also provides a hot melt ink jet ink consisting essentially of 20 to 90% by weight of wax and 1 to 15% by weight of one or more colorant preparations according to the invention. It may further include 0 to 20% by weight of an additional polymer (as "dye dissolver"), 0 to 5% by weight of dispersing assistant, 0 to 20% by weight of viscosity modifier, 0 to 20% by weight of plasticizer, 0 to 10% by weight of tack additive, 0 to 10% by weight of transparency stabilizer (which prevents for example crystallization of the wax) and also 0 to 2% by weight of antioxidant. Typical additives and auxiliaries are described for example in U.S. Pat. No. 5,560,760.

The ink jet inks according to the invention can be prepared by dispersing the colorant preparations into the microemulsion medium or into the aqueous or nonaqueous medium or into the medium for preparing the UV-curable ink or into the wax for preparing the hot melt ink jet ink.

As well as for printing paper, natural or synthetic fiber materials, films or plastics, the colorant preparations according to the invention can be used for printing a wide variety of coated or uncoated substrate materials, for example for printing paperboard, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material can be two-dimensionally planar or extend in space, ie be three-dimensional, and be printed or coated completely or only in parts.

It has been determined that the colorant preparations according to the invention have altogether advantageous application properties and optimally fulfil the aforementioned offices and requirements in ink jet printing. The viscosity remains stable not only at room temperature but also in the course of one weeks of storage at 60° C. and the particle size distribution changes only insignificantly during storage. The inks produced from the preparations are notable especially for markedly good behavior in ink jet printing due to good stability during storage and in the ink jet printing operation. Moreover, the prints produced are notable for their high light and water fastness.

The colorant preparations according to the invention are also useful as colorants in electrophotographic toners and developers, for example one component and two component powder toners or developers, magnetic toners, liquid toners, polymerization toners and also other specialty toners. Typical toner binders are addition polymerization, polyaddition and polycondensation resins, eg styrene, styrene-acrylate, styrene-butadiene, acrylate, polyester or phenolic epoxy resins, poloysulfones and polyurethanes, individually or in combination, and also polyethylene and polypropylene, which may include yet further ingredients, such as charge control agents, waxes or flow agents, or may have added to them subsequently.

The colorant preparations according to the invention are further useful as colorants in powder coatings, especially in triboelectrically or electrostatically sprayed powder coatings which are used for surface coating articles made for example of metal, wood, plastic, glass, ceramic, concrete, textile material, paper or rubber. Useful powder coating resins typically include epoxy resins, carboxyl- and hydroxyl-containing polyester resins, polyurethanes and acrylic resin together with customary hardeners. Combinations of resins are also used. For instance, epoxy resins are frequently used in combination with carboxyl- and hydroxyl-containing polyester resins. Typical hardener components (depending on the resin system) are for example acid anhydrides, imidazoles and also dicyandiamide and their derivatives, capped isocyantes, bisacylurethanes, phenolic and melamine resins, triglycidyl isocyanurates, oxazolines and dicarboxylic acids.

The colorant preparations according to the invention are also useful as colorants for color filters and also for additive as well as subtractive color generation.

EXAMPLES

I Production of a Pigment Preparation (General Prescription):

The pigment, either as a powder or as a presscake, was pasted up together with the dispersant, the organic solvent and the other additives in deionized water and then homogenized and predispersed using a dissolver. The subsequent fine dispersion was effected using a bead mill, the grinding being effected with cooling to the desired pigment particle size distribution. Subsequently, the dispersion was adjusted with deionized water to the desired final pigment concentration.

The pigment preparations described in the examples hereinbelow were produced by the above-described process:

Examples Nos. 1 to 4 (see Table 1) Ink jet preparation comprising

| | | |
|---|---|---|
| 15% | by weight of | pigment |
| 5% | by weight of | dispersant 1 |
| 10% | by weight of | propylene glycol |
| 1% | by weight of | defoamer (® Dehydran 975 from Cognis) |
| 69% | by weight of | water |

TABLE 1

| Example No.: | Pigment |
|---|---|
| 1 | C.I. P. Blue 15:3 |
| 2 | C.I. P. Red 122 |
| 3 | C.I. P. Yellow 155 |
| 4 | C.I. P. Black 7 |

Dispersant 1 consists of a mixture of an alkoxylated naphthol of the formula (III) and of a sulfopropylated alkoxylated naphthol of the formula (IV).

(III)

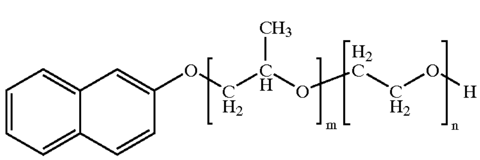

-continued (IV)

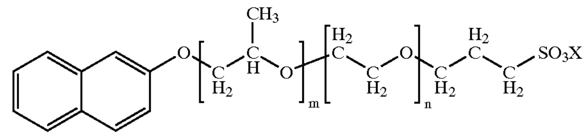

The conditions for the parameters m, n and X are:

m=2.5 on average n=14 on average

X=potassium ion

Owing to the synthesis (sulfopropylation reaction) dispersant 1 contains about 20% by weight of molecules of the formula (III) and about 80% by weight of molecules of the formula (IV).

Examples No. 5 to 8 (see Table 2) Ink jet preparation comprising

| | | |
|---|---|---|
| 15% | by weight of | pigment |
| 5% | by weight of | dispersant 2 |
| 10% | by weight of | propylene glycol |
| 1% | by weight of | defoamer (® SERDAS 7010 from CONDEA) |
| 69% | by weight of | water |

TABLE 2

| Example No.: | Pigment |
|---|---|
| 5 | C.I. P. Blue 15:3 |
| 6 | C.I. P. Red 122 |
| 7 | C.I. P. Yellow 120 |
| 8 | C.I. P. Yellow 155 |

Examples No. 9 to 12 (see Table 3) Ink jet preparation comprising

| | | |
|---|---|---|
| 15% | by weight of | pigment |
| 5% | by weight of | dispersant 3 |
| 10% | by weight of | propylene glycol |
| 1% | by weight of | defoamer (® SERDAS 7010 from CONDEA) |
| 69% | by weight of | water |

TABLE 3

| Example No.: | Pigment |
|---|---|
| 9 | C.I. P. Blue 15:3 |
| 10 | C.I. P. Red 122 |
| 11 | C.I. P. Yellow 120 |
| 12 | C.I. P. Yellow 155 |

Dispersants 2 and 3 each consist of mixtures of alkoxylated alkanols of the formula (V) and sulfopropylated alkoxylated alkanols of the formula (VI)

(V)

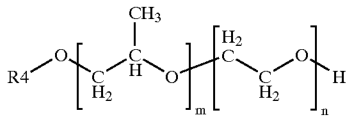

(VI)

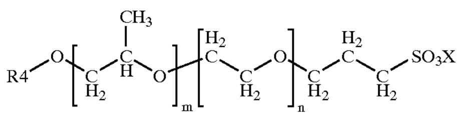

Owing to the synthesis (sulfopropylation reaction) the dispersants 2 and 3 contain about 15% by weight of molecules of the formula (V) and about 85% by weight of molecules of the formula (VI); the conditions for dispersant 2 are:

R4=mixture of about 60% by weight of tridecanyl ($C_{13}H_{27}$), about 10% by weight of tetradecanyl ($C_{14}H_{29}$) and about 30% by weight of pentadecanyl ($C_{15}H_{31}$)

m=0 n=7 on average

X=potassium ion while the conditions for dispersant 3 are as follows:

R4=mixture of about 60% by weight of tridecanyl ($C_{13}H_{27}$), about 10% by weight of tetradecanyl ($C_{14}H_{29}$) and about 30% by weight of pentadecanyl ($C_{15}H_{31}$)

m=0 n=11 on average

X=potassium ion

II Investigation of Physical Properties of Pigment Preparations Mentioned in the Examples 1 to 12:

The physical properties of the pigment preparations were investigated using the following methods and equipment:

II.1 Viscosity Measurement (Dynamic Viscosity)

The viscosity was determined using a Haake (Roto Visco 1) cone-plate viscometer (titanium cone: Ø 60 mm, 1°) by investigating the dependence of the viscosity on the shear rate in a range between 0 and 700 1/s. The viscosity values mentioned in the table were measured at a shear rate of 400 1/s. To evaluate the storage stability of the dispersions, the effect of the storage time and of the storage temperature on the viscosity was investigated. To this end, the viscosity was measured (1) directly after production of the preparation, (2) after one week of storage at room temperature (25° C.) and (3) after one week of storage at 60° C.

II.2 Particle Sizes

The particle sizes of the preparations ($D_{50}$ values) were determined by the capillary hydrodynamic fractioning (CHDF) method following one week of storage at 25 or 60° C. In the case of stable dispersions, no coagulation of the pigment particles should take place regardless of the storage conditions; more particularly, the storage temperature should have little if any influence on particle size.

Table 4 hereinbelow gives an overview of the physical properties of the various pigment preparations mentioned in the examples:

TABLE 4

| Example | Viscosity [mPas] | | | $D_{50}$ [nm] | |
|---|---|---|---|---|---|
| | $\eta$[25° C.] | $\eta$[25° C.]$_{1\ week}$ | $\eta$[60° C.]$_{1\ week}$ | 25° C. | 60° C. |
| 1 | 5.5 | 5.3 | 5.9 | 85.0 | 97.4 |
| 2 | 6.5 | 6.1 | 7.0 | 88.4 | 91.4 |
| 3 | 9.4 | 10.5 | 6.8 | 134.4 | 129.2 |
| 4 | 11.6 | 13.1 | 22.9 | 82.3 | 100.2 |
| 5 | 7.2 | 7.3 | 7.4 | 89.3 | 95.7 |
| 6 | 7.3 | 7.0 | 10.8 | 78.5 | 82.2 |
| 7 | 11.3 | 17.0 | 30.3 | 127.1 | 96.9 |
| 8 | 6.9 | 6.8 | 6.5 | 99.2 | 101.5 |
| 9 | 10.9 | 10.8 | 10.7 | 84.9 | 86.2 |
| 10 | 11.2 | 10.4 | 10.5 | 82.2 | 88.7 |
| 11 | 9.3 | 8.6 | 8.7 | 96.7 | 99.9 |
| 12 | 11.6 | 11.5 | 9.8 | 115.3 | 109.4 |

All the examples of pigment preparations according to the invention that are listed in Table 4 possess excellent flowability. To evaluate their stability in storage, first the viscosities $\eta$[25° C.] of the freshly produced preparations were measured (cf. Table 5). Thereafter, the preparations were each stored for one week at 25 or 60° C. and subsequently the viscosities $\eta$[25° C.]$_1$ week and $\eta$[60° C.]$_{1\ week}$ of the dispersions stored at 25 and 60° C. respectively were determined. In the case of very stable dispersions, the viscosities should not change from the original viscosity. The measured results in Table 4 show that only very minimal viscosity changes occur as a result of storage and that the dispersions are accordingly all stable.

The $D_{50}$ values reported in Table 4 show that only small changes in the average particle sizes occur in all cases. Thus, the pigment particles do not coagulate in the course of storage, indicating very good stability in storage on the part of the dispersions. Furthermore, some of the dispersions were stored at 60° C. for 4 weeks (eg the pigment preparations of examples 1, 2, 3 and 4) in no case was a dispersion observed to flocculate. Even longer storage periods were investigated at room temperature. Here, there were no signs of sedimentation whatsoever even after 3 months, indicating a very high stability on the part of the dispersions produced. Even aqueous dilutions of these pigment concentrates to a pigment content of 3% display the same stability features.

III Testing of Printing Properties of Pigment Preparations

Knowledge of the physical properties of pigment preparations alone is not sufficient to make a statement about their suitability for ink jet printing. In thermal ink jet (bubble jet) printing especially, the behavior of the pigment dispersions during the printing process in the nozzles is important. The large albeit brief thermal stresses must not cause the pigment dispersion to decompose, for example in that the dispersant molecules desorb from the pigment surface because this would cause the pigment particles to agglomerate. Such decomposition processes could on the one hand lead to cogation and on the other over time to nozzle clogging by the decomposition products.

The suitability of pigment preparations for producing inks for the ink jet process can thus only be judged by carrying out printing tests. To evaluate the printing properties of the pigment preparations, the preparations were used to produce test inks whose printability was investigated using a thermal ink jet printer (cf. Table 5).

To produce the test inks, the pigment preparations were initially finely filtered through a 1 μm filter to remove grinding media attritus and any coarse fractions. Thereafter, the filtered preparations were diluted with water and admixed with further low molecular weight alcohols and polyols. The test inks then have the following composition:

| | |
|---|---|
| 33.33% | of pigment preparation (Examples 1 to 12) |
| 46.67% | of demineralized water |
| 10% | of ethylene glycol |
| 10% | of diethylene glycol |

The composition of the test inks was chosen so that the viscosity was in a range from 1.5 to 5 mPas. To adjust the surface tension of the inks to a value needed for optimum printing performance, small amounts of surfactants can be admixed if necessary.

The test inks were characterized using the following methods and equipment:

III.1 Print Head Jet Formation Behavior of Ink

An HP print RIG with Optica System from Vision Jet was used to investigate the behavior of the test inks in ink jet printing using an HP 420 thermal ink jet printer from HP. A video camera can be used to investigate the behavior of the injkets during the printing operation at individual nozzles of the ink jet print head. The video images provide information as to how the pigmented ink behaves in the course of the formation of the ink jets, whether the ink is expelled from the nozzles of the print head in the form of straight, linear jets, whether individual drops are formed or whether the drops have satellites. The investigations provide additional information on the shape of ink drops and indicate irregularities in drop formation, for example due to cloggages of individual nozzles.

The inks investigated possess a very good jet formation behavior, as is discernible from the fact that the individual ink jets are parallel and leave the nozzles at right angles to the surface. None of the nozzles is clogged. Jet and drop formation is very uniform in that individual drops are formed from the ink jets over time without smaller satellite droplets being observed.

III.2 Investigation of Printing Behavior

In addition, the HP 420 printer was used to print test images on commercially available normal papers (copy papers) and specialty papers (premium quality) from HP. The evaluation of the prints with regard to quality and finish of the printed image was done by purely visual inspection. It was noted whether the paper was greatly moistened, whether the pigment penetrated into the paper or whether the pigment remained stuck to the surface of the paper. It was further noted to what extent fine lines were perfectly reproduced, whether the ink spread out on the paper, resulting in low resolution, or whether it was possible to produce high resolution prints. The start of print behavior was investigated after prolonged pauses in the printing to see whether a good and flawless print was ensured instantly or whether individual nozzles channels were clogged by the ink drying, which led to a poor printed image.

The criteria (III.1) and (III.2) were used to evaluate the print quality of the inks on the following scale from 1 to 6 (cf. Table 5):

1—Very good printed image, lovely uniform jet and drop formation
2—Very good printed image, uniform jet but nonuniform drop formation
3—Good printed image, nonuniform jet and drop formation
4—Nonuniform fuzzy printed image, random orientation of ink jets and drops
5—Poor, stripy printed image, individual nozzles clogged
6—Ink will not print, all nozzles clogged very quickly

TABLE 5

| Example | Print quality |
|---|---|
| 1 | 2–3 |
| 2 | 1 |
| 3 | 1–2 |
| 4 | 1 |
| 5 | 1 |
| 6 | 1 |
| 7 | 2–3 |
| 8 | 2 |
| 9 | 3 |
| 10 | 1 |
| 11 | 2–3 |
| 12 | 2 |

The pigment preparations fully meet the ink jet printing requirements with regard to physical and printing properties and so are particularly useful for applications in ink jet printing.

What is claimed is:

1. An aqueous colorant preparation comprising:

A) 0.1 to 50% by weight of at least one organic and/or inorganic pigment and/or at least one organic dye, B) 0.01 to 80% by weight of at least one naphthol alkoxylate sulfopropyl ether, alkanol alkoxylate sulfopropyl ether or alkylphenol alkoxylate sulfopropyl ether, C) 0 to 30% by weight of at least one organic solvent, D) 0 to 20% by weight of at least one additive, E) 10 to 90% by weight of water, each percentage being based on the total weight (100% by weight) of the colorant preparation.

2. An aqueous colorant preparation as claimed in claim 1, wherein component (A) is a monoazo, disazo, laked azo, β-naphthol, Naphtol AS, benzimidazolone, disazo condensation, azo metal complex, phthalocyanine, quinacridone, perylene, perinone, thiazineindigo, thioindigo, anthanthrone, anthraquinone, flavanthrone, indanthrone, isoviolanthrone, pyranthrone, dioxazine, quinophthalone, isoindolinone, isoindoline, diketopyrrolopyrrole pigment or a carbon black pigment.

3. An aqueous colorant preparation as claimed in claim 1, wherein component (A) is a Colour Index dye Acid Yellow 17, Acid Yellow 23, Direct Yellow 86, Direct Yellow 98, Direct Yellow 132, Reactive Yellow 37, Acid Red 52, Acid Red 289, Reactive Red 23, Reactive Red 180, Acid Blue 9, Direct Blue 199 or a mixture thereof.

4. An aqueous colorant preparation as claimed in claim 1, wherein component (B) is a compound of the formula (II) or a mixture of a compound of formula (II) with a compound of the formula (I)

(I)

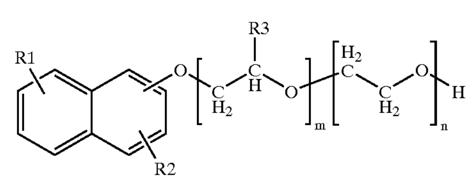

-continued (II)

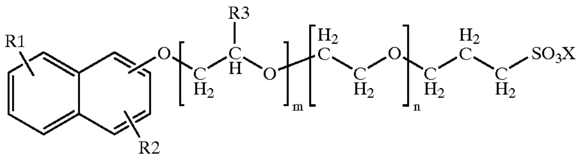

where

R1 and R2 are identical or different and are each a $C_1$–$C_{12}$-alkyl radical which may contain polar groups such as alcohol groups, amine groups, keto groups, amide groups or ester groups, or are each a phenyl radical or H, R3 is a $C_1$–$C_4$-alkyl radical or a phenyl radical, m is from 0 to 50, n is from 1 to 100, subject to the proviso that $n \geqq m$;

X is a singly positively charged ion.

5. An aqueous colorant preparation as claimed in claim 1, wherein component (B) is a compound of the formula (VI) or a mixture of a compound of (VI) with a compound of the formula (V)

(V)

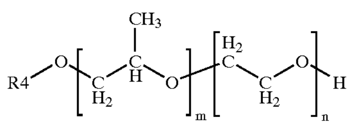

(VI)

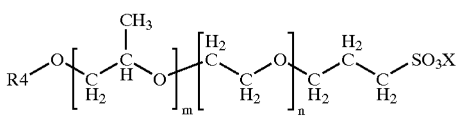

where

R4 is R5 or

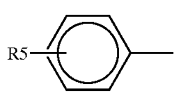

R5 is a $C_1$–$C_{24}$-alkyl radical which may contain polar groups m is from 0 to 50, n is from 1 to 100, X is a singly positively charged ion.

6. A process for producing an aqueous colorant preparation as claimed in claim 1 comprising the steps of mixing component A with at least one dispersant (component B) in water (component E) to form a paste and homogenizing the paste.

7. A colorant for printing inks, ink jet inks, electrophotographic toners, polymerization toners, powder coatings and color filters comprising an aqueous color preparation as claimed in claim 1.

8. A set of colorant preparations comprising at least one colorant preparation in each of the colors black, cyan, magenta and yellow, wherein at least one of the preparations is an aqueous colorant preparation as claimed in claim 1.

9. A set as claimed in claim 8, wherein the colorant of the black colorant preparation is a carbon black, the colorant of the cyan colorant preparation being a pigment selected from the group consisting of phthalocyanine pigments, the colorant of the magenta colorant preparation is a pigment selected from the group consisting of quinacridone pigments, monoazo, disazo, isoindoline and benzimidazolone pigments, and the colorant of the yellow colorant preparation is a pigment selected from the group consisting of monoazo-, disazo-, and benzimidazolone pigments.

10. A printing ink comprising the set of colorant preparations as claimed in claim 8.

11. An aqueous colorant preparation as claimed in claim 4, wherein X is the ion of an alkali metal, a hydrogen ion, an ammonium ion, or a mono-, di- tri- or tetraalkylammonium ion.

12. An aqueous colorant preparation as claimed in claim 5, wherein R5 is a $C_1$–$C_{24}$-alkyl radical containing polar groups, wherein the polar groups are selected from the group consisting of alcohol groups, amine groups, keto groups, amide groups and ester groups.

13. An aqueous colorant preparation as claimed in claim 5, wherein X is the ion of an alkali metal, a hydrogen ion, an ammonium ion or a mono-, di-, tri- or tetraalkylammonium ion.

14. The process as claimed in claim 6, wherein the mixing step further comprises adding at least one organic solvent (component C) to the paste.

15. The process as claimed in claim 6, wherein the mixing step further comprises adding at least one additive (component D) to the paste.

16. The process as claimed in claim 6, further comprising the step of dispersing the paste.

17. The set as claimed in claim 9, wherein the colorant of the black colorant preparation is selected from the group consisting of lampblack and furnace black, wherein the colorant of the cyan colorant preparation is a pigment selected from the group consisting of Colour Index P. Blue 15, P. Blue 15:3 and Pigment Blue 15:4, wherein the color of the magenta colorant preparation is a pigment selected from the group consisting of Colour Index P. Red 122, P. Violet 19, P. Red 57:1, P. Red 146, Pigment Red 176, P. Red 184, P. Red 185 and Pigment Red 269, and wherein the colorant of the yellow colorant preparation is a pigment selected from the group consisting of Colour Index P. Yellow 17, P. Yellow 74, P. Yellow 83, P. Yellow 97, P. Yellow 120, Pigment Yellow 128, P. Yellow 139, P. Yellow 151, Pigment Yellow 155, P. Yellow 180 and P. Yellow 213.

18. An ink jet ink comprising the set of colorant preparations as claimed in claim 8.

* * * * *